(12) United States Patent
Hamanaka

(10) Patent No.: US 8,978,724 B2
(45) Date of Patent: Mar. 17, 2015

(54) PNEUMATIC TIRE/RIM ASSEMBLY

(75) Inventor: Hideki Hamanaka, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 456 days.

(21) Appl. No.: 12/988,023

(22) PCT Filed: Apr. 24, 2009

(86) PCT No.: PCT/JP2009/058184
§ 371 (c)(1),
(2), (4) Date: Oct. 15, 2010

(87) PCT Pub. No.: WO2009/133823
PCT Pub. Date: Nov. 5, 2009

(65) Prior Publication Data
US 2011/0030868 A1    Feb. 10, 2011

(30) Foreign Application Priority Data

Apr. 30, 2008    (JP) ................................. 2008-118119

(51) Int. Cl.
*B60C 17/01*    (2006.01)
*B60C 17/02*    (2006.01)
(Continued)

(52) U.S. Cl.
CPC ............... *B60C 19/122* (2013.04); *B60C 17/02* (2013.01); *B60C 5/22* (2013.01); *B29D 30/0681* (2013.01); *B29D 2030/0695* (2013.01); *B60C 5/04* (2013.01); *B60C 17/01* (2013.01)
USPC ......... 152/340.1; 152/518; 152/519; 152/511

(58) Field of Classification Search
CPC ........ B60C 17/01; B60C 17/02; B60C 17/00; B60C 5/20; B60C 5/22; B60C 19/12; B60C 5/02; B60C 5/04; B60C 5/08; B60C 5/10
USPC ................ 152/518, 519, 339.1, 340.1, 341.1, 152/342.1, 331.1, 511, 512
See application file for complete search history.

(56) References Cited

U.S. PATENT DOCUMENTS 3,941,176 A * 3/1976 Schwartz .................. 152/518 X
4,216,809 A * 8/1980 Pixley ....................... 152/518 X
(Continued)

FOREIGN PATENT DOCUMENTS

| JP | 3-197211 A | 8/1991 |
| JP | 2002-059718 A | 2/2002 |
| JP | 2003146032 A * | 5/2003 |

(Continued)

OTHER PUBLICATIONS

Online version of Webster's Third International Dictionary, Unabridged, Merriam-Webster Inc., 1993, definition of "film".*

(Continued)

*Primary Examiner* — Adrienne C Johnstone
(74) *Attorney, Agent, or Firm* — Carrier Blackman & Associates, P.C.; William D. Blackman; Fulchand P. Shende

(57) ABSTRACT

Provided is a pneumatic tire/rim assembly which is improved in the run-flat durability with the mass of the tire being reduced. In a pneumatic tire/rim assembly with a run-flat capability, an air bladder (2) made of a circular ring-shaped film body is inserted inside a pneumatic tire (1) mounted on a rim (R). At least part of the film body is formed of a sealing layer (3) made of a thermoplastic resin or a thermoplastic elastomer composition obtained by blending an elastomer in a thermoplastic resin.

3 Claims, 1 Drawing Sheet

(51) Int. Cl.
  *B60C 5/22* (2006.01)
  *B60C 5/04* (2006.01)
  *B60C 19/12* (2006.01)
  *B29D 30/06* (2006.01)

(56) References Cited

U.S. PATENT DOCUMENTS

| 4,928,741 | A | * | 5/1990 | Rye et al. |
| 2008/0073013 | A1 | | 3/2008 | Tanaka |
| 2009/0020204 | A1 | * | 1/2009 | Tanaka |

FOREIGN PATENT DOCUMENTS

| JP | 2004-090807 A | 3/2004 |
| JP | 2005-081922 A | 3/2005 |
| JP | 2005-297837 A | 10/2005 |
| JP | 2006-240008 A | 9/2006 |
| WO | 2006/013681 A1 | 2/2006 |

OTHER PUBLICATIONS

English machine translation of JP 2003-146032 A, May 21, 2003.*
English machine translation of JP 2004-90807 A, Mar. 25, 2004.*
English machine translation of JP 2005-297837 A, Oct. 27, 2005.*

* cited by examiner

PNEUMATIC TIRE/RIM ASSEMBLY

TECHNICAL FIELD

The present invention relates to a pneumatic tire/rim assembly, and more specifically to a pneumatic tire/rim assembly which is improved in the run-flat durability with the mass of the tire being reduced.

BACKGROUND ART

There are various types of pneumatic tires which are designed to be capable of running continuously for a certain distance even after the tires are punctured. Among those, there are types in which an inner circumferential surface of a tire is supported in a case of puncture by a ring-shaped support member arranged in an inner space of the tire. What are widely known as these types include: a type in which a run-flat support body is arranged inside a tire; and a type in which an air bladder made of a circular ring-shaped film body is inserted inside a tire.

Out of these types of tires, in the type in which an air bladder made of a circular ring-shaped film body is inserted inside a tire, the internal pressure of the air bladder is generally set equal to or higher than that of the pneumatic tire. The air bladder is configured to change its shape by expanding its diameter, and thus supports load when the internal pressure of the tire becomes lower as a result of the tire's puncture. To this end, a material with low air permeability such as butyl rubber is used for the film body constituting the air bladder. Moreover, a design which enables the durability to be secured for run-flat running is applied. A proposal has been heretofore made for a configuration of the film body of the air bladder, in which a reinforcement cord layer is arranged on the outer circumferential wall of the film body (see Patent Document 1). Another proposal has been made for a configuration of the film body, in which a rigid plate is arranged on the outer circumferential surface of the film body (see Patent Document 2).

However, both proposals have a problem that the arrangement of the reinforcement cord layer or the rigid plate increases the mass of the tire, and a demand for lower fuel consumption cannot be accordingly satisfied. In addition, there is a problem that it is difficult to maintain the internal pressure of the air bladder for a long period of time, and decrease in the internal pressure of the air bladder accordingly results in decrease in the run-flat durability.

PRIOR ART DOCUMENT

Patent Documents

Patent Document 1: Japanese patent application Kokai publication No. 2002-59718
Patent Document 2: Japanese patent application Kokai publication No. 2005-81922

SUMMARY OF THE INVENTION

Problem to be Solved by the Invention

An object of the present invention is to solve the above-described problems, and to provide a pneumatic tire/rim assembly which is improved in the run-flat durability without requiring a reinforcement cord layer or a rigid plate on the outer circumferential wall of the air bladder film body, and with the mass of the tire being decreased.

Means for Solving the Problems

A pneumatic tire/rim assembly to achieve the object of the present invention is a pneumatic tire/rim assembly with a run-flat capability, in which: an air bladder made of a toroidal ring-shaped film body is inserted inside a pneumatic tire mounted on a rim; and a space is provided between a tread inner circumferential surface of the pneumatic tire and an outer circumferential surface of the air bladder with an internal pressure of the air bladder being set equal to or higher than that of the pneumatic tire, the film body having a sufficient strength and thickness to support a load normally applied to the pneumatic tire, in a condition where the air bladder expands its diameter when the pneumatic tire is punctured resulting in the internal pressure of the pneumatic tire being lower in an area outside of the film body, the pneumatic tire/rim assembly characterized in that at least part of the film body is formed of a sealing layer made of any one of a thermoplastic resin and a thermoplastic elastomer composition obtained by blending an elastomer in a thermoplastic resin.

In addition, it is desirable that the foregoing configuration should be achieved in accordance with (1) to (5) described as below.

(1) Tan $\delta$ of any one of the thermoplastic resin and the thermoplastic elastomer composition at 60° C. is set at 0.05 to 0.30.

(2) An air permeability of any one of the thermoplastic resin and the thermoplastic elastomer composition is set at $0.5 \times 10^{-11}$ cc·cm/cm$^2$·sec·cmHg to $3.0 \times 10^{-11}$ cc·cm/cm$^2$·sec·cmHg.

(3) The sealing layer is arranged on the outer circumferential surface of the film body.

(4) The air bladder is made of a laminated body of the sealing layer and a rubber layer.

(5) The sealing layer is arranged on the inner circumferential surface of the pneumatic tire.

Effects of the Invention

In the present invention, at least part of the air bladder is formed of the sealing layer made of the thermoplastic resin or the thermoplastic elastomer composition obtained by blending an elastomer in the thermoplastic resin. For this reason, the internal pressure of the air bladder is maintained by the air impermeability of this sealing layer, which extends continuously throughout the air bladder at a specified level, in order to maintain such internal pressure. This makes it possible to enhance the durability for run-flat running. In addition, because no special reinforcement layer such as a reinforcement cord layer or a rigid plate is needed to be arranged on the air bladder, the mass of the assembly does not increase. Furthermore, because at least part of the rubber material of the air bladder is replaced with the sealing layer, whose mass is smaller than the mass of the rubber, the mass of the tire can be reduced.

In addition, the sealing layer is made of the thermoplastic resin or the thermoplastic elastomer composition whose tan $\delta$ is smaller than that of the rubber thereby producing heat less than the rubber. Thus, it is possible to inhibit heat from being produced due to repeated deformation of the air bladder during run-flat running. For this reason, the run-flat durability can be enhanced efficiently.

BEST MODES FOR CARRYING OUT THE INVENTION

Hereinafter, detailed descriptions will be provided for a configuration of the present invention with reference being made to the attached drawings.

Figure 1:
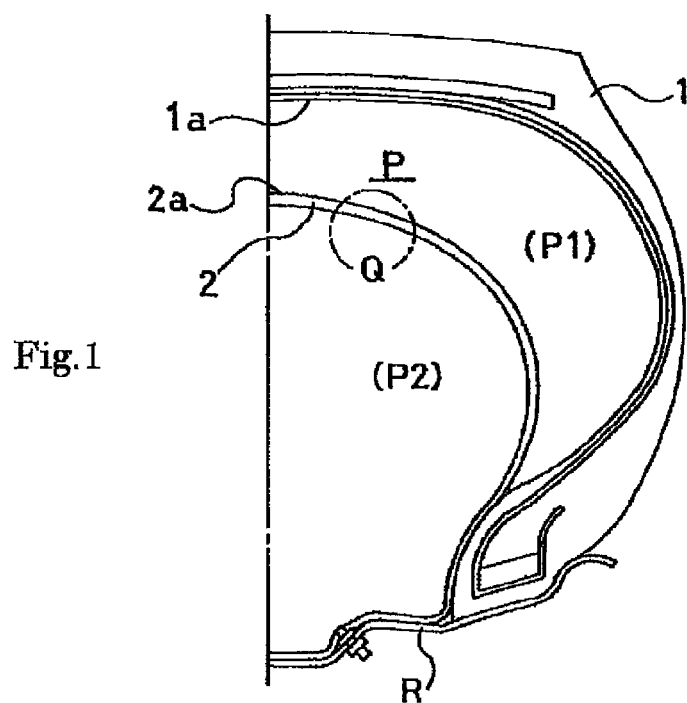
FIG. 1 is a half cross-sectional view showing a pneumatic tire/rim assembly according to an embodiment of the present invention.

FIG. 1 is a half cross-sectional view showing a pneumatic tire/rim assembly according to an embodiment of the present invention in a meridian direction of the tire.

In the pneumatic tire/rim assembly of the present invention, as shown in FIG. 1, an air bladder 2 made of a toroidal ring-shaped film body is inserted inside a pneumatic tire 1 mounted on a rim R. An internal pressure p2 of this air bladder 2 is kept equal to or higher than an internal pressure p1 of the pneumatic tire 1. A space P is formed between a tread inner circumferential surface 1a and an outer circumferential surface 2a of the air bladder 2 of this pneumatic tire.

FIG. 2 shows partial cross-sectional views each showing a Q part of the air bladder 2 in FIG. 1 in a magnified manner.

In the case of the present invention, as shown in FIGS. 2A to 2E, at least part of the film body constituting the air bladder 2 is made by including a sealing layer 3 which is made of a thermoplastic resin or a thermoplastic elastomer composition obtained by blending an elastomer in the thermoplastic resin. In the drawings, reference numeral 4 denotes a rubber layer.

Because at least part of the film body constituting the air bladder 2 is made by including the sealing layer 3 made of the thermoplastic resin or the thermoplastic elastomer composition as described above, the internal pressure of the air bladder 2 is maintained due to the air impermeability of this sealing layer 3, which extends continuously throughout the air bladder 2, at a specified level, in order to maintain such internal pressure. In other words, while the sealing layer 3 may constitute only part of the air bladder 2 because other layers may be provided as illustrated in FIGS. 2A-2D, the sealing layer extends continuously throughout the air bladder 2 in order to provide its sealing function. This enhances the durability needed for run-flat running.

In addition, because no special reinforcement layer such as a reinforcement cord Layer or a rigid plate is needed to be arranged on the film body of the air bladder 2, the mass of the assembly does not increase. Furthermore, because at least part of the rubber material of the air bladder is replaced with the sealing layer, whose mass is smaller than that of the rubber, the mass of the tire can be reduced.

Examples of the thermoplastic resin preferably used to make the sealing film 3 include: polyamide-based resins [for instance, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers]; their N-alkoxyalkylates [for instance, methoxymethylated nylon 6, methoxymethylated nylon 6/610 copolymers, and methoxymethylated nylon 612]; polyester-based resins [for instance, aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for instance, polyacrylonitirile (PAN), polymethacrylonitrile, acrylonitrile/styrene copolymers (AS), (meth) acrylonitrile/styrene copolymers, (meth)acrylonitrile/styrene/butadiene copolymers]; polymethacrylate-based resins [for instance, polymethyl methacrylate (PMMA), polyethylmethacrylate]; polyvinyl-based resins [for instance, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers]; cellulose-based resins [for instance, cellulose acetate, and cellulose acetate butyrate]; fluororesins [for instance, polyvinylidene fluoride (PVDF), polyvinyl fluoride (PVF), polychlorotrifluoroethylene (PCTFE), tetrafluoroethylene (ETFE)/ethylene copolymers]; imide-based resins [for instance, aromatic polyimide (PI)]; and the like.

In addition, the thermoplastic elastomer composition used for the present invention may be made by blending the above-mentioned thermoplastic resin with an elastomer.

Examples of the elastomer preferably used to make the thermoplastic elastomer composition include: diene rubbers and their hydrogenated products [for instance, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, hydrogenated SBR]; olefin-based rubbers [for instance, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers]; halogen-containing rubbers [for instance, Br-IIR, CI-IIR, brominated isobutylene para-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for instance, methyl vinyl silicone rubber, dimethyl silicone rubber, methylphenylvinyl silicone rubber]; sulfur-containing rubbers [for instance, polysulfide rubber]; fluororubbers [for instance, vinylidene fluoride-based rubbers, fluorine-containing vinyl ether-based rubbers, tetrafluoroethylene propylene-based rubbers, fluorine-containing silicone-based rubbers, fluorine-containing phosphazene-based rubbers]; thermoplastic elastomers [for instance, styrene-based elastomers, olefin-based elastomers, ester-based elastomers, urethane-based elastomers, and polyamide-based elastomers]; and the like.

If a specific one of the above-mentioned thermoplastic resins is incompatible with a specific one of the above-mentioned elastomers, an appropriate compatibilizer may be used as a third component to make the thermoplastic resin and the elastomer compatible with each other. The interfacial tension between the thermoplastic resin and the elastomer decreases when such a compatibilizer is mixed in the blend system of the thermoplastic resin and the elastomer. As a result, the size of rubber particles constituting the dispersion phase becomes finer, and these two components accordingly exhibit their characteristics more effectively. In general, such a compatibilizer may have a copolymer structure including both or either of a structure of the thermoplastic resin and a structure of the elastomer, or a copolymer structure including an epoxy group, carbonyl group, a halogen group, an amino group, an oxazoline group, or a hydroxyl group, which is capable of reacting with the thermoplastic resin or the elastomer. Such a compatibilizer may be selected depending on the types of the thermoplastic resin and the elastomer with which the compatibilizer is mixed. Examples of the compatibilizer normally used include: styrene/ethylene-butylene block copolymers (SEBS) and their maleic acid-modified products; EPDM; EPM; EPDM/styrene or EPDM/acrylonitrile graft copolymers, and their maleic acid-modified products; styrene/maleic acid copolymers; reactive phenoxine; and the like. No specific restriction is imposed on the blending proportion of such a compatibilizer. It is desirable that the blending proportion of such a compatibilizer should be 0.5 to 10 parts by weight per 100 parts by weight of the polymer components (the total amount of the thermoplastic resin and the elastomer).

No specific restriction is imposed on the component ratio of the specific thermoplastic resin to the specific elastomer in the thermoplastic elastomer composition. This component ratio may be set as appropriate in order that the thermoplastic elastomer composition can have a structure in which the elastomer is dispersed as a discontinuous phase in the matrix of the thermoplastic resin. It is desirable that this component ratio should be in a range of 90/10 to 30/70 in weight ratio.

In the case of the present invention, the thermoplastic resin and the thermoplastic elastomer composition used to make the sealing layer 3 may be mixed with other polymers, for instance, the above-mentioned compatibilizer and the like, as long as the other polymers do not impair the characteristics needed for the sealing layer 3. The purposes of mixing such other polymers are to improve the compatibility between the thermoplastic resin and the elastomer, to improve the molding processability of the material, to improve the heat resistance, to reduce costs, and so on. Examples of materials used as such other polymers include polyethylene (PE), polypropylene (PP), polystyrene (PS), ABS, SBS, polycarbonate (PC), and the like. In addition, a filler (calcium carbonate, titanium oxide, alumina or the like) generally blended in the polymer blend, a reinforcing agent such as carbon black and white carbon, a softener, a plasticizer, a processing aid, a pigment, a dye, an antioxidant, and the like may be blended optionally as long as the blended materials do not impair the characteristics needed for the sealing layer 3.

The thermoplastic elastomer composition thus obtained has a structure in which the elastomer component (B) is dispersed as a discontinuous phase in the matrix of the thermoplastic resin (A). Having such a structure, this thermoplastic elastomer composition can ensure both a sufficient flexibility and a sufficient rigidity based on the effect of the resin layer as the continuous phase. Furthermore, when this thermoplastic elastomer composition is molded, the thermoplastic elastomer composition can ensure a molding processability equivalent to that of the thermoplastic resin, whether the elastomer component may be larger or smaller in amount.

The adhesion of the sealing layer 3 and the rubber layer 4 in the present invention may be achieved by: applying an adhesive to the surface of the rubber layer 4, the adhesive obtained by dissolving a polymer such as a regular rubber-based, phenol resin-based, acrylic copolymer-based, or isocyanate-based polymer and a crosslinking agent in a solvent; and then adhering the rubber layer 4 and the sealing layer 3 to each other by use of the heat and pressure which are applied when the air bladder 2 is cured. Examples of the solvent-based adhesive include a phenol resin-based adhesive (Chemlok 220 manufactured by Lord Corporation), chloride rubber-based adhesives (Chemlok 205 and Chemlok 234B), an isocyanate-based adhesive (Chemlok 402), and the like.

In the case of the present invention, it is desirable to control the tan $\delta$ of the thermoplastic resin or the thermoplastic elastomer composition at 60° C. to fall within a range of 0.05 to 0.30, preferably, within a range of 0.10 to 0.20. This control can suppress heat generation due to repeated deformations of the air bladder 2 during run-flat running. Thus, run-flat durability can be effectively improved.

In this respect, the above tan $\delta$ is defined as a value obtained from a measurement made by use of a viscoelasticity spectrometer (manufactured by Iwamoto Seisakusho) under conditions that: a frequency is 20 Hz; an initial distortion is 10%; a dynamic distortion is ±2%; and a temperature is 60° C.

In addition, it is desirable to control the air permeability of the above-mentioned thermoplastic resin or the thermoplastic elastomer composition to fall within a range of $0.5 \times 10^{-11}$ cc·cm/cm$^2$·sec·cmHg to $3.0 \times 10^{-11}$ cc·cm/cm$^2$·sec·cmHg, preferably, within a range of $0.5 \times 10^{-11}$ cc·cm/cm$^2$·sec·cmHg to $1.0 \times 10^{-11}$ cc·cm/cm$^2$·sec·cmHg. This control maintains the internal pressure of the air bladder 2 appropriately. Thus, the air bladder 2 can ensure a function as an air container. Accordingly, the run-flat durability can be securely improved.

Furthermore, from the viewpoint of maintaining the durability of the air bladder 2 during run-flat running, it is desirable that the Young's modulus of the above-mentioned thermoplastic resin or the above-mentioned thermoplastic elastomer composition in the standard atmosphere specified by JIS K7100 should be controlled to fall within a range of 1 MPa to 500 MPa, preferably within a range of 10 MPa to 300 MPa.

Figures 2A, 2B:
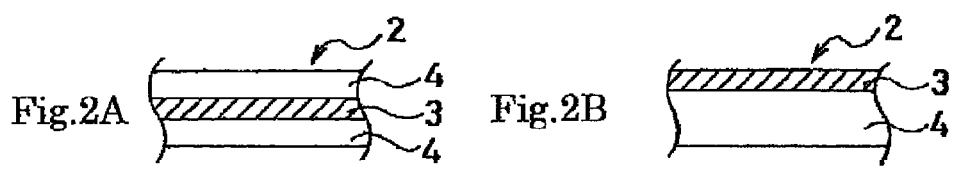
FIGS. 2A to 2E are partial cross-sectional views each showing a structure of an air bladder in a pneumatic tire according to the embodiment of the present invention.

The arrangement of the sealing layer 3 in the film body constituting the air bladder 2 can be achieved by placing the sealing layer 3 in an intermediary region in the film body as shown in FIG. 2A. Otherwise, the sealing layer 3 can be arranged in the outer circumferential surface (side facing the tread inner circumferential surface 1a of the pneumatic tire 1) of the film body as shown in FIG. 2B. The configuration shown in FIG. 2A is effective in protecting the air bladder 2 from external damage. The configuration shown in FIG. 2B is effective in suppressing damage which occurs in a contact surface between the tread inner circumferential surface 1a and the outer circumferential surface 2a of the air bladder 2 during run-flat running.

In other words, in a case where a foreign object comes toward the air bladder 2 from the tread inner circumferential surface 1a during run-flat running, this foreign object needs to be blocked by the outer circumferential surface 2a of the air bladder 2. To this end, it is desirable that, as shown in FIG. 2A, the rubber layer 4 should be arranged on the outer circumferential surface 2a of the air bladder 2 instead of the sealing layer 3 which is vulnerable to damage from the exterior. Furthermore, for the purpose of preventing damage from occurring due to friction between the tread inner circumferential surface 1a and the outer circumferential surface 2a of the air bladder 2 during run-flat running, it is desirable that, as shown in FIG. 2B, the sealing layer 3 whose coefficient of friction is lower than that of rubber should be arranged on the outer circumferential surface 2a of the air bladder. 2.

Figures 2C, 2D:
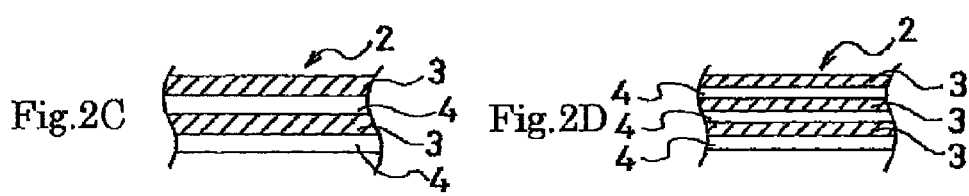

Moreover, as shown in FIGS. 2C and 2D, the film body constituting the air bladder 2 may be made of a laminated body of the sealing layers 3 and the rubber layers 4. With the laminated body, even if a foreign object comes from the tread inner circumferential surface 1a during run-flat running, entrance of this foreign object can be stopped by the multiple rubber layers 4. This ensures a far better run-flat durability.

Figure 2E:

Further, in the present invention, the film body constituting the air bladder 2 may be made of only the sealing layer 3 as shown in FIG. 2E instead of the above-mentioned arrangements of the sealing layers 3 shown in FIGS. 2A to 2D. In the case where the air bladder 2 is made of the sealing layer 3 alone, the run-flat durability can be securely enhanced although the resistance against external damage decreases.

In the present invention, when the sealing layer(s) 3 and the rubber layer(s) 4 are formed into a laminated body as shown in FIGS. 2A to 2D, it is desirable to set the thickness of each sealing layer 3 at 30 μm to 500 μm, preferably at 50 μm to 150 μm, from the viewpoint of preventing increase in mass and reduction in productivity. On the other hand, in the case where the entire film body is made of the sealing layer 3 as shown in FIG. 2E, it is desirable to set the thickness of the sealing layer 3 at 500 μm to 1500 μm, preferably at 600 μm to 1200 μm, from the viewpoint of securing the durability of the air bladder 2 during run-flat running.

In the pneumatic tire/rim assembly of the present invention, it is also advantageous to optionally arrange a second sealing layer 3 on the tread inner circumferential surface 1a of the pneumatic tire 1, in addition to the sealing layer 3 provided as at least a part of the air bladder 2. This arrangement further reduces 14 frictional resistance in the contact surface between the tread inner circumferential surface 1a and the outer circumferential surface 2a of the air bladder 2 during run-flat running, and accordingly suppresses damage on the rubber in the contact surface. Thus, the run-flat durability can be securely enhanced further.

EXAMPLES

A conventional type of assembly (Conventional Example) and assemblies according to the present invention (Examples 1 to 8) were produced with a tire size of 295/75 R22.5, and with the tire structure shown in FIG. 1, the assemblies differing from one another in arrangement of the sealing layer(s) in the air bladder, a ratio of the volume of the sealing layer(s) to the volume of the air bladder (simply referred to as a "ratio of sealing layer(s)" in Table 1), and presence or absence of the sealing layer arranged on the tread inner circumferential surface as shown in Table 1. Note that for each assembly, the thickness of the air bladder was set at 1.2 mm, and a butyl-based rubber composition was used as the material for the rubber layer. A blend of a nylon 6/66 copolymer and a brominated isobutylene para-methylstyrene copolymer (Br-IPMS) was commonly used as the material for the sealing layers of the assemblies according to the present invention.

For each assembly, the mass of the tire was measured before the tire was mounted on the rim. Results of the measurements are shown together in Table 1 by indexes where the mass of the tire of Conventional Example is taken as 100.

Thereafter, the assemblies were each made by: mounting the tire on the rim (size of 22.5×9.00); inflating the pneumatic tire to an air pressure of 790 kPa; and inflating the air bladder to an air pressure of 860 kPa. Subsequently, the internal pressure of the pneumatic tire of each assembly was reduced to the atmospheric pressure, and, by use of a drum testing machine, the pneumatic tire of each assembly was caused to run on a drum at a running speed of 60 km/h with load of 27.47 kN. For each assembly, the running distance until the air bladder was no longer able to support the load was measured. The run-flat durability was evaluated by use of a result of the measurement. The run-flat durabilities are shown together in Table 1 by indexes where the run-flat durability of Conventional Example is taken as 100.

TABLE 1

|  |  | Conventional Example | Example 1 | Example 2 | Example 3 | Example 4 | Example 5 | Example 6 | Example 7 | Example 8 |
|---|---|---|---|---|---|---|---|---|---|---|
| Arrangement of sealing layer(s) |  | — | FIG. 2A | FIG. 2A | FIG. 2E | FIG. 2B | FIG. 2A | FIG. 2B | FIG. 2C | FIG. 2D |
| Ratio of sealing layer(s) (%) |  | — | 10 | 50 | 100 | 50 | 50 | 50 | 50 | 50 |
| Arrangement of sealing layer(s) on tread inner circumferential surface |  |  | absent | absent | absent | absent | present | present | present | present |
| Evaluation | Mass of tire | 100 | 99 | 97 | 94 | 97 | 96 | 96 | 96 | 96 |
|  | Run-flat durability | 100 | 105 | 120 | 150 | 140 | 140 | 160 | 160 | 160 |

It is learned from Table 1 that the assemblies according to the present invention have smaller mass of tire, and concurrently have better run-flat durability, than the assembly according to Conventional Example.

Explanation of Reference Numerals
1 pneumatic tire
2 air bladder
3 sealing layer
4 rubber layer
P space
R rim

What is claimed is:

1. A pneumatic tire/rim assembly with a run-flat capability, in which:
   an air bladder made of a toroidal ring-shaped film body is inserted inside a pneumatic tire mounted on a rim; and a space is provided between a tread inner circumferential surface of the pneumatic tire and an outer circumferential surface of the air bladder, with an internal pressure of the air bladder being set equal to or higher than that of the pneumatic tire, the film body having a sufficient strength and thickness to support a load normally applied to the pneumatic tire, in a condition where the air bladder expands in diameter when the pneumatic tire is punctured resulting in the internal pressure of the pneumatic tire being lower in an area outside the film body,
   wherein all of the film body is formed of a first sealing layer made of any one of a thermoplastic resin and a thermoplastic elastomer composition obtained by blending an elastomer in a thermoplastic resin, the first sealing layer extending continuously throughout the air bladder at a specified level thereof, and
   wherein an air permeability of any one of the thermoplastic resin and the thermoplastic elastomer composition is set at $0.5 \times 10^{-11}$ cc·cm/cm$^2$·sec·cmHg to $3.0 \times 10^{-11}$ cc·cm/cm$^2$·sec·cmHg.

2. The pneumatic tire/rim assembly according to claim 1, characterized in that tan δ of any one of the thermoplastic resin and the thermoplastic elastomer composition at 60° C. is set at 0.05 to 0.30.

3. The pneumatic tire/rim assembly according to claim 1, characterized in that a second sealing layer is arranged on the inner circumferential surface of the pneumatic tire, the second sealing layer being made of any one of a thermoplastic resin and a thermoplastic elastomer composition obtained by blending an elastomer in a thermoplastic resin.

* * * * *